June 8, 1948.  W. R. POLYE  2,442,823

RADIANT ENERGY RECEIVER

Filed March 13, 1944

INVENTOR.
William R. Polye.
BY
ATTORNEY

Patented June 8, 1948

2,442,823

UNITED STATES PATENT OFFICE 2,442,823

RADIANT ENERGY RECEIVER

William R. Polye, River Edge, N. J., assignor to Bendix Aviation Corporation, Teterboro, N. J., a corporation of Delaware Application March 13, 1944, Serial No. 526,244

13 Claims. (Cl. 250—83.3)

This invention relates generally to radiant energy devices and more particularly to radiant energy receiver cells of the type utilizing a material adapted for releasing a gas flow within the cell in response to radiant energy.

A well known method of detecting the presence of radiant energy is to allow the radiant energy to enter a closed chamber containing finely divided carbonized material having gas adsorbing characteristics whereby the material releases gas to flow within the chamber. It has been, heretofore, proposed to utilize the resulting increase in gas pressure within the chamber to cause mechanical movement of some suitable expedient in such a way that the pressure changes are transformed into electrical changes. A serious disadvantage, however, in the use of known systems is that they are necessarily affected by mechanical vibrations in that they must depend upon movement of bodies having considerable inertia.

An object of the present invention, therefore, is to provide a novel receiver cell responsive to radiant energy and one which will remain substantially unaffected by mechanical vibration.

Another object of the invention is to provide a novel radiant energy receiver cell having no moving parts whereby errors due to accelerations, vibrations or shocks are eliminated.

A further object is to provide a novel radiant energy receiver cell utilizing a heated resistor element and a material which in response to radiant energy emits a gas flow on the resistor to vary the value thereof, the resistor being arranged in a suitable and normally balanced electrical circuit whereby in response to the gas flow the circuit becomes unbalanced.

The above and further objects and novel features of the invention will more fully appear from the following detailed description when the same is read in connection with the accompanying drawings. It is to be expressly understood, however, that the drawings are for purposes of illustration only and are not intended as a definition of the limits of the invention.

In the drawings, wherein like reference characters refer to like parts throughout the several views.

The principle utilized in perfecting the present invention is that the resistance of a current conductor will vary as the temperature of the conductor is varied, i. e., the resistance to current flow increases with increase in temperature and decreases with a decrease in temperature. The conductor herein is in the form of a coil element mounted in such a manner that gas flow released by a radiant energy responsive substance impinges upon the element to vary its temperature and, therefore, its resistance to current flow.

Figure 1:
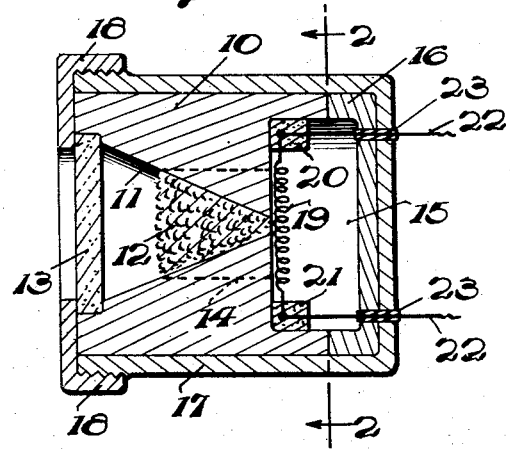
Figure 1 is a side elevation view in section of the novel radiant energy receiver cell of the present invention.

Referring now more particularly to Figure 1 of the drawings for a more detailed description of the present invention, the receiver cell is shown as comprising a body portion 10 having a central conical chamber 11 formed therein, the chamber being provided with a finely divided dark substance 12, such as carbonized vegetable fibres in the form of a fine fluff. Substance 12 is selected principally for its property to release stored or adsorbed gases when exposed to rays of radiant energy.

The open or flared end of chamber 11 is closed by a window 13 formed of suitable material, such as, rock-salt, for example, while the interior of the chamber is placed in communication through a relatively narrow slot 14 with a chamber 15 defined by the rear of body portion 10 and a spacer element 16. A suitable casing 17 supports body portion 10 as well as element 16 therein while a retaining ring 18 is provided for closing the open end of the casing and for maintaining window 13 in sealable relation with chamber 11.

Figure 2:
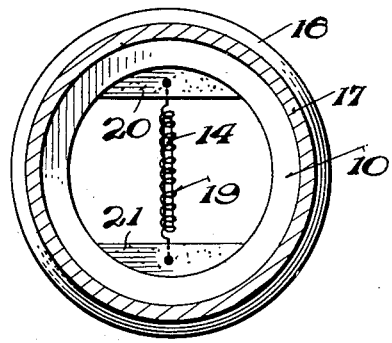
Figure 2 is a view taken substantially along line 2—2 of Figure 1.

Arranged within chamber 15 and directly behind slot 14, as better shown in Figure 2, is a coil 19 anchored at one end to an insulator 20 and at its other end to an insulator 21, the coil consisting of many turns of extremely fine wire rigidly connected between the two insulators. Suitable conductors 22 connected to coil 19 are withdrawn to the outside of casing 17 through insulated apertures 23.

Figure 3:
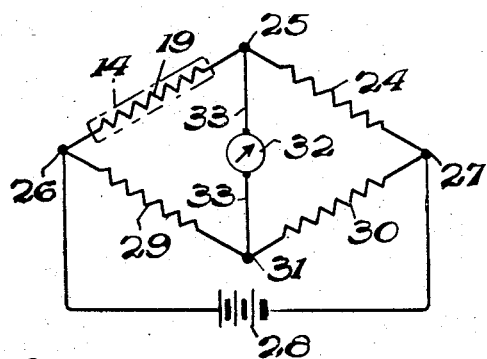
Figure 3 represents one form of measuring circuit adapted for use with the receiver cell of Figure 1.

Coil 19 may constitute one leg of a Wheatstone bridge arrangement and as better shown in Figure 3 it is connected with a second leg having a resistor 24, each leg being provided with a common mid-point 25 and outer taps 26 and 27, a suitable source of current, such as, battery 28, for example, being connected across outer taps 26, 27. A second pair of resistors 29 and 30 are connected to taps 26 and 27 and are provided with a common mid-point 31, the two mid-points being connected to a galvanometer 32 by way of leads 33. Normally, the above-described circuit is balanced, however, as soon as the resistance of coil 19 is changed the circuit becomes unbalanced and a difference in potential is developed across mid-points 25 and 31 which is registered by galvanometer 32.

Figure 4:
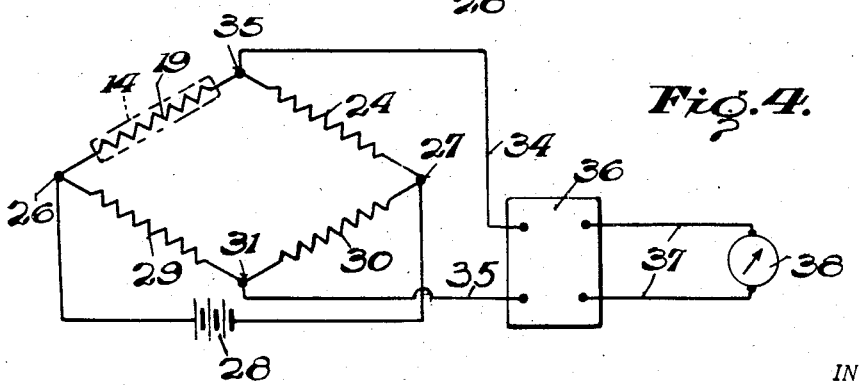
Figure 4 represents another form of an electrical measuring circuit adapted for use with the receiver cell of Figure 1.

As shown in the arrangement of Figure 3 the change in the resistance of coil 19 may be indicated directly by meter 32 or, if desired, the change be introduced into a conventional amplifier followed by a suitable indicator. To this end, therefore, the arrangement of Figure 4 is provided wherein the leads 33 and galvanometer 32 of Figure 3 are eliminated and in their stead the mid-points 25 and 31 are connected by means of conductors 34 and 35 with the input of a conventional vacuum tube amplifier 36, the output of which is fed by way of leads 37 to an indicator 38. Although an indicator has been shown connected to the output of the amplifier it is to be expressly understood that any desired positioning or controlling device may be provided in its place.

Coming now to the operation of the novel radiant energy receiver cell of the present invention, when radiant energy falls upon substance 12 contained within chamber 11, adsorbed gases are released suddenly by the substance to flow through slot 14 and impinge upon coil 19 to cool the latter, the temperature of the coil being normally maintained higher than the ambient temperature by reason of the fact that current from battery 28 flows the coil. Cooling of coil 19 by the gases passing through slot 14 results in a change in its resistance so that the circuit is no longer balanced and a difference in potential is developed across mid-points 25 and 31 which may be either registered directly upon meter 32 of Figure 3 or fed into amplifier 36 to actuate the indicator 38 of Figure 4.

The heat capacity of coil 19 is very low due to the extremely small wire diameter and, therefore, the resistance changes occur rapidly. The response of the cell to outside mechanical vibrations is practically eliminated because it does not depend upon any mechanical movement for operation. Moreover, movement of coil 19 with respect to the surrounding gas atmosphere within chamber 15 is minimized by the fact that the coil has extremely small mass and thus very little inertia.

The sensitivity of the receiver cell, above described, may be increased by installing two coils in place of the single coil 19 in which event the remaining legs of the circuit must be designed so that the circuit will be normally balanced. Furthermore, the sensitivity may be also increased by selecting wire for the coil which possesses a high temperature coefficient of resistance.

It will now be apparent to those skilled in the art that a novel radiant energy receiver cell has been provided which is accurate and reliable in performance and one which remains substantially unaffected by mechanical vibrations resulting from accelerations or shocks imposed upon the cell.

Although but a single embodiment of the present invention has been illustrated and described in detail, it is to be expressly understood that the invention is not limited thereto. Various changes may be made in the design and arrangement of the parts without departing from the spirit and scope of the invention, as will now be understood by those skilled in the art. For a definition of the limits of the invention, reference will be had primarily to the appended claims.

I claim:

1. Radiant energy receiving apparatus comprising an electrical circuit having a conductor whose resistance varies in accordance with a change in the temperature thereof, a source of current in said circuit for providing current flow in said conductor to raise the temperature thereof relative to ambient temperatures, and means responsive to radiant energy for causing a gas to flow for cooling said conductor to thereby vary the resistance thereof.

2. Radiant energy receiving apparatus comprising an electrical circuit having a conductor whose resistance varies in accordance with a change in the temperature thereof, gas adsorbing means responsive to radiant energy for causing gas flow to impinge upon said conductor to vary the temperature thereof, and a source of current in said circuit for providing current flow in said conductor to raise the temperature thereof relative to ambient temperatures.

3. Radiant energy receiving apparatus comprising a normally balanced electrical circuit having a conductor whose resistance varies in accordance with a change in the temperature thereof, means responsive to radiant energy for causing a gas to flow to vary the temperature of said conductor whereby said circuit becomes unbalanced, a source of current in said circuit for providing current flow in said conductor to raise the temperature thereof relative to ambient temperatures, and an indicator connected to said circuit.

4. Radiant energy receiving apparatus comprising a normally balanced electrical circuit having a conductor whose resistance varies in accordance with a change in the temperature thereof, gas adsorbing means responsive to radiant energy for causing gas flow to impinge upon said conductor to vary the temperature thereof whereby said circuit becomes unbalanced, a source of current in said circuit for providing current flow in said conductor to raise the temperature thereof relative to ambient temperatures, an amplifier connected to said circuit, and an indicator connected to said amplifier.

5. Radiant energy receiving apparatus comprising a casing, an electrical circuit including a conductor mounted in said casing, the resistance of said conductor varying in accordance with a change in the temperature thereof, a chamber within said casing, means communicating said chamber with said conductor, means within said chamber responsive to radiant energy for causing a gas to flow to vary the temperature of said conductor, and a source of current in said circuit for providing current flow in said conductor to raise the temperature thereof relative to ambient temperatures.

6. Radiant energy receiving apparatus provided with a casing, means comprising a conductor mounted in said casing, the resistance of said conductor varying in accordance with a change in the temperature thereof, a closed chamber within said casing, means defining a passage between said chamber and said conductor, gas adsorbing means within said chamber responsive to radiant energy for causing gas flow through said passage to impinge upon said conductor whereby the temperature thereof is varied, and a source of current connected to said conductor for providing a current flow therein to raise the temperature thereof relative to ambient temperatures.

7. Radiant energy receiving apparatus comprising an electrical circuit containing a coil of fine wire, the resistance of the coil varying in accordance with a change in the temperature thereof, means responsive to radiant energy for causing a gas to flow to vary the temperature of said coil, and a source of current in said circuit for providing current flow in said wire to raise the temperature thereof relative to ambient temperatures.

8. Radiant energy receiving apparatus having a casing, means comprising a coil of fine wire mounted within said casing, the resistance of the coil varying in accordance with a change in the temperature thereof, a closed chamber within said casing, means defining a passage between said chamber and said conductor, gas adsorbing means within said chamber responsive to radiant energy for causing gas flow through said passage to impinge upon said coil whereby the temperature thereof is varied, and a source of current connected to said wire for providing a current flow therein to raise the temperature thereof relative to ambient temperatures.

9. In combination, a Wheatstone bridge circuit having one leg thereof formed of means whose electrical resistance varies with a change in the temperature thereof, gas adsorbing material responsive to radiant energy for causing gas flow to impinge upon said means to vary the temperature thereof, and a source of current for said circuit providing current flow in said one leg to raise the temperature thereof relative to ambient temperatures.

10. In combination, a Wheatstone bridge circuit having one leg thereof formed of means whose electrical resistance varies with a change in the temperature thereof whereby a difference in potential is developed across two points of said circuit, an indicator connected to said circuit and responsive to said difference in potential, means responsive to radiant energy for causing a gas to flow to vary the temperature of said first-named means, and a source of current connected to said circuit providing current flow in said one leg to raise the temperature thereof relative to ambient temperatures.

11. In combination, a Wheatstone bridge circuit having one leg thereof formed of means whose electrical resistance varies with a change in the temperature thereof whereby a difference in potential is developed across two points of said circuit, an amplifier connected to said circuit across said two points, an indicator connected to said amplifier and responsive to said difference in potential, means responsive to radiant energy for causing a gas to flow to vary the temperature of said first-named means, and a source of current connected to said circuit providing current flow in said one leg to raise the temperature thereof relative to ambient temperatures.

12. In combination, a Wheatstone bridge circuit, a coil of fine wire comprising one leg of said circuit, the electrical resistance of said coil varying with a change in the temperature thereof whereby a difference in potential is developed across two points of said circuit, means connected to said circuit and responsve to said difference in potential, means responsive to radiant energy for causing a gas to flow to vary the temperature of said coil, and a source of current in said circuit for providing current flow in said wire to raise the temperature thereof relative to ambient temperatures.

13. In combination with a casing, a Wheatstone bridge circuit, a coil of fine wire comprising one leg of sad circuit and mounted within said casing, the electrical resistance of said coil varying with a change in the temperature thereof whereby a difference in potential is developed across two points of said circuit, a closed chamber within said casing, means defining a passage between said chamber and said coil, gas adsorbing means within said chamber responsive to radiant energy for causing gas to flow through said passage to impinge upon said coil whereby the temperature thereof is varied, a source of current in said circuit for providing current flow in said wire to raise the temperature thereof relative to ambient temperatures, and means connected to said circuit and responsive to said difference in potential.

WILLIAM R. POLYE.

REFERENCES CITED

The following references are of record in the file of this patent:

UNITED STATES PATENTS

| Number | Name | Date |
| --- | --- | --- |
| 1,107,438 | Moskowitz | Aug. 18, 1914 |
| 1,229,740 | Furstenau | June 12, 1917 |
| 1,776,901 | Essex et al. | Sept. 30, 1930 |
| 1,963,185 | Wilson | June 19, 1934 |
| 2,349,715 | Francis | May 23, 1944 |
| 2,352,377 | Francis | June 27, 1944 |